Sept. 27, 1960 R. T. BRASHEAR 2,954,470
MASS SPECTROMETER AND METHOD
Filed April 12, 1957 2 Sheets-Sheet 1
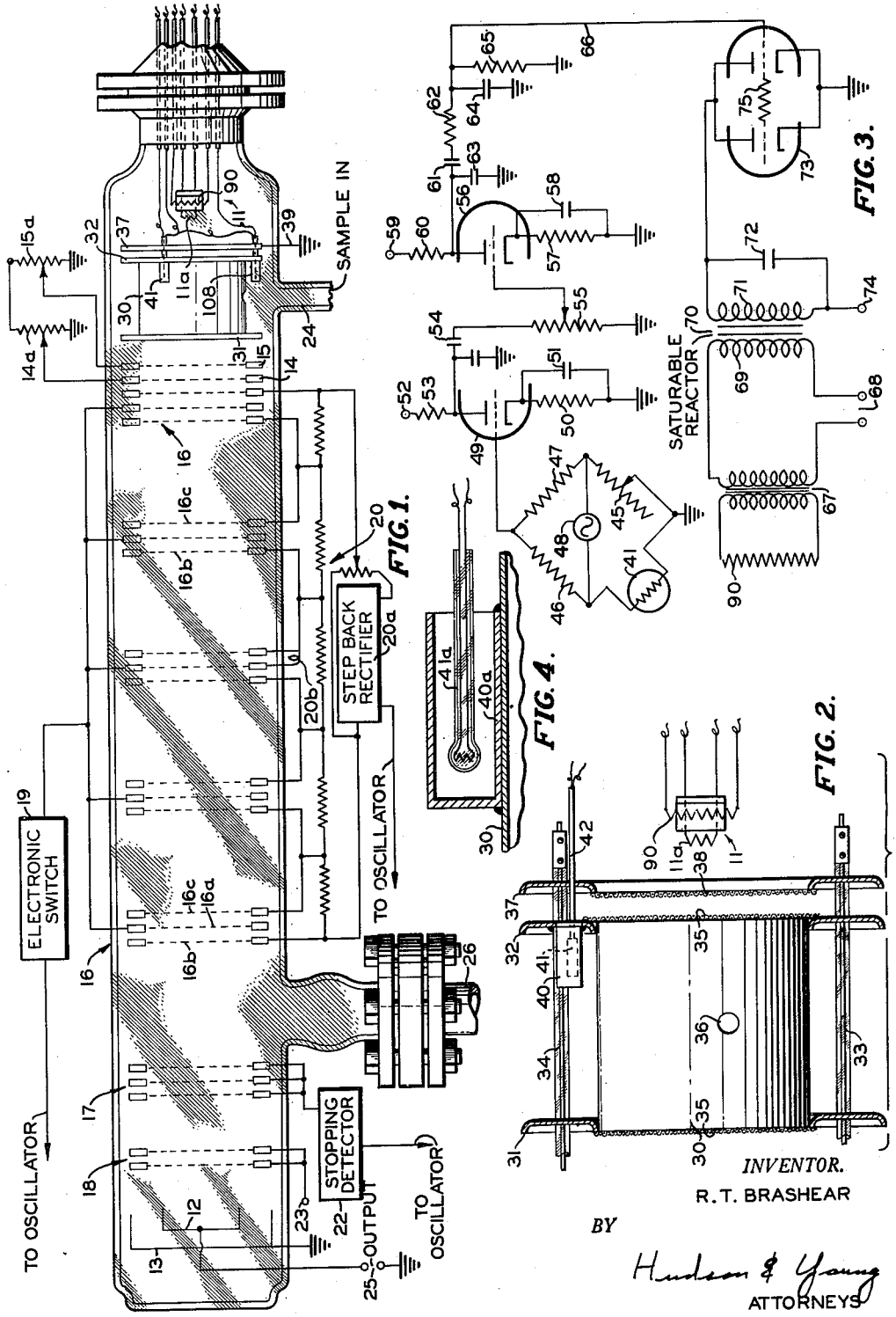
INVENTOR.
R. T. BRASHEAR
BY
Hudson & Young
ATTORNEYS

United States Patent Office 2,954,470
Patented Sept. 27, 1960

2,954,470

MASS SPECTROMETER AND METHOD

Roy T. Brashear, Bartlesville, Okla., assignor to Phillips Petroleum Company, a corporation of Delaware Filed Apr. 12, 1957, Ser. No. 652,570

2 Claims. (Cl. 250—41.9)

This invention relates to a method of analyzing a sample. In another aspect, it relates to a mass spectrometer tube and circuit therefor. In still another aspect, it relates to a temperature control circuit.

I have found that the operation of many types of vacuum tubes can be improved as the temperature at a given region of the tube is maintained at a constant preselected value. This is particularly true in a mass spectrometer tube where a portion of a sample is ionized, and the resulting ionized particles of a given mass number are selectively accelerated toward a collector electrode by application of a suitable field, which can be either an electric or magnetic field. In such tubes, variation in the temperature of the ionization zone may change the composition of the sample, due to changes in the cracking pattern where the sample gas is a hydrocarbon, or side reactions between components of the sample which may be affected by temperature. Also, in such tubes, the emission current of the cathode is kept constant. Different samples, however, affect the emissivity of the cathode, so the cathode temperature may vary, from sample to sample, so as to maintain this constant emission current.

In accordance with this invention, the temperature inside the tube is sensed, as by a thermistor, and a signal is thereby produced which is utilized to maintain constant the temperature of the ionization zone, or other zone of interest in the vacuum tube. The control is effected, in accordance with the invention, by connecting the operating winding of a saturable reactor in series with line supplying a heater element with current. A signal representative of the thermistor output is then amplified, if necessary, and applied to the operating winding of the saturable reactor to effect the temperature control. This heater is, as far as possible, electrically and thermally isolated from the cathode, and does not contribute appreciably to the electron emission. Hence, it compensates for variations in cathode temperature required to keep the emission current constant for various types of sample materials.

In the manner, an ionization zone or other zone of interest within an evacuated tube can be conveniently and accurately maintained at a desired temperature. This is particularly advantageous in mass spectrometers wherein changes in temperature of the ionization zone may cause changes in the cracking pattern of hydrocarbon-containing sample gases.

Accordingly, it is an object of the invention to provide an improved mass spectrometer apparatus and method wherein variation in sample composition due to changes in temperature are eliminated or substantially minimized.

It is a further object to provide an improved temperature control circuit which is economical, utilizes a minimum number of circuit components, and is very reliable and accurate in operation.

Various other objects, advantages, and features of the invention will become apparent upon reading the following detailed description taken in conjunction with the accompanying drawings, in which:

Figure 1 is a schematic view of a mass spectrometer tube utilizing the temperature control system of the invention;

Figure 2 is an enlarged, vertical sectional view, partially in elevation of the ionization chamber;

Figure 3 is a schematic circuit diagram of the temperature compensator;

Figure 4 is an enlarged sectional view of a modified thermistor arrangement.

Figure 5:
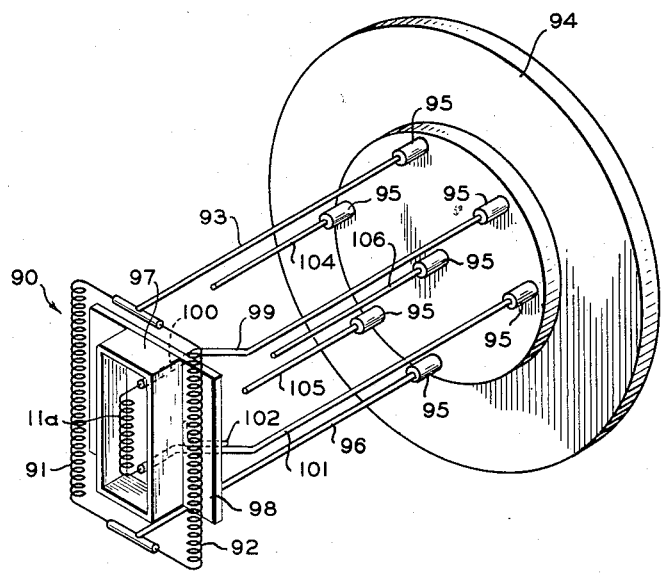
Figure 5 is a perspective view of the heater-cathode assembly.

Referring now to Figure 1, we have shown a mass spectrometer tube 10 having a heater-cathode assembly 11, a collector electrode 12, a grounded shield electrode 13 together with a multiplicity of control electrodes including focusing elements 14, 15 connected to potentiometers 14a, 15a, respectively, to supply them with operating voltages, five sets 16 of control electrodes, a set 17 of stopping electrodes, and a set 18 of suppressor electrodes. Each set 16 of electrodes include a central electrode 16a and all of the electrodes 16a are connected through an electronic switch 19 to an oscillator, not shown. Each set 16 further includes outer electrodes 16b and 16c, and all of the electrodes 16b, 16c are connected through a resistance network 20 to a stepback rectifier 20a and the aforementioned radio frequency oscillator. A radio frequency choke connects the central electrodes with a terminal of the network 20. The stopping electrodes 17 are connected through a stopping detector 22 to the oscillator, and the suppressor grids 18, which repel secondary electrons, are connected to a negative terminal 23.

When current of a predetermined frequency is applied to the grid elements 16, ions of a predetermined mass number are selectively accelerated toward the collector electrode 12, and an output current is produced representative of the number of ions of said selected mass number in the ionized sample.

The assembly 11 includes a cathode 11a which is controlled to provide a constant emission current, as by sensing the current to the primary winding of the cathode transformer and maintaining it at a constant value through regulation of a saturable reactor connected in series with the primary winding. A detailed circuit for this purpose is shown in the copending application of D. A. Fluegal and M. C. Burk, Serial No. 510,192, filed May 23, 1955. The assembly 11 further includes a heater 90 which emits few electrons and is thermally and electrically shielded from the cathode 11a, as will become apparent hereafter.

Referring now to Figures 1 and 2, it will be noted that a generally cylindrical ionization chamber 30 is mounted within the envelope 10 and spaced between the assembly 11 and the first set of grids 16. The chamber 30 is provided with flanged rings 31 and 32 which are secured to and carried by a set of longitudinal rods, two of which are shown at 33 and 34. A grid 35 is mounted at the central part of each ring 31 and 32 to cover the ends of the ionization chamber, and the chamber itself is provided with a small opening 36 at the side thereof which is radially aligned with a sample inlet tube 24, Figure 1. A ring 37, similar to the ring 32 is carried by the rods 33, 34 and disposed between the assembly 11 and the chamber 30, this ring being provided with a central grid 38 and being electrically connected to ground at 39.

In accordance with the invention, a thermistor well 40 of generally cup-shaped arrangement is secured, as by spot welding, to the flanged portion of the ring 32. A thermistor 41 is mounted within the well and held in place by a relatively rigid conductor 42 which is fed through the flange of the tube. Accordingly, the thermistor 41 is in thermal contact with the ionization chamber.

An alternative arrangement is illustrated in Figure 4 wherein it will be noted that a well 40a is secured, as by spot welding, to the side of the chamber 30 and a thermistor 41a, similar to the thermistor 40, is mounted within this well in thermal contact with the interior ionization chamber.

Referring now to Figure 3, the thermistor 41 is connected in a Wheatstone bridge circuit with a variable resistance 45, balancing resistances 46, 47 and an alternating current source 48 of the same frequency as the current source connected at 74. One set of opposite corners of the bridge is connected, respectively, to ground and the control grid of a triode 49, the cathode of which is connected to ground through a bias resistor 50 having a condenser 51 in shunt therewith. The anode of the tube 49 is connected to a positive terminal 52 by a fixed resistance 53 and also through a coupling condenser 54 to a grid potentiometer 55 having its contactor connected to the control grid of a triode 56. The cathode of the triode 56 is connected to ground by a bias resistance 57 shunted by a condenser 58. The anode of the tube is connected to a positive terminal 59 by a fixed resistance 60 and to a filter including a series condenser 61, a series resistance 62, parallel condensers 63, 64, and a parallel resistance 65.

It will be evident that the output of the filter, which appears at conductor 66, varies in magnitude depending upon the magnitude of the variation in temperature of the thermistor 41 from a fixed predetermined value. The tubes 49, 56, and their associate parts function to amplify the bridge signal, potentiometer 55 serving as a gain control and variable resistance 45 serving to balance the bridge at a predetermined temperature of the thermistor 41. The filter acts in conjunction with a condenser 72 and a winding 71 to obtain the proper phase relationship between the grid and plate voltages of a tube 73.

The heater 90 is connected to the secondary winding of a power transformer 67, the primary winding of which is connected in series with an alternating current source 68, and an operating winding 69 of a saturable reactor 70. Thus, the voltage applied to the heater, and hence its temperature, is controlled by the reactance of the winding 69. The saturable reactor 69 also has a control winding 71 having a parallel condenser 72 and connected in the anode-cathode circuit of a tube 73.

To this end, one terminal of the winding 71 is connected to a source of alternating current at terminal 74 and the other end is connected to both anodes of the tube 73, both cathodes of which are grounded. The control grids are interconnected by a fixed resistance 75 and one of these control grids is connected to the conductor 66 for receiving the output of the thermistor bridge.

Accordingly, changes in magnitude and sense of the bridge output are amplified and applied to the control winding 71 of the saturable reactor so as to vary the current supplied to the heater 90 and, hence, the temperature of the ionization zone 30. This is because the tube 73 is a single tube phase detector acting as a half-wave rectifier in response to phase shifts caused by temperature effects on thermistor 41. For example, suppose 41 gets warmer than a preselected value and the combined effects of the filtering (in 61–65) and condenser 72 move the grid signal in 73 more into phase, with the signal at 74, than previously. This increases the current flow in control winding 71, which in turn causes less current to flow in operating winding 69 and in the primary of transformer 67. The latter therefore reduces the power (current) applied to heater 90. Heat is thereby reduced. The opposite effects occur when 41 senses a lowering of temperature. In this manner, a constant predetermined temperature is maintained in the ionization zone so that temperature differences existing between analyses of successive samples do not affect the output of the instrument, such temperature differences resulting, for example, from changes in temperature of the cathode 11a required to maintain a constant emission current with different types of samples. This is of particular advantage in a mass spectrometer tube where changes may occur in the cracking pattern of a hydrocarbon-containing sample responsive to such temperature differences. Also, in either types of tubes, it is frequently advantageous to maintain a preselected region of the tube at a constant operating temperature, which can be readily effected by the simple circuit and control system of the present invention.

The structure of the heater-cathode assembly is shown in more detail by Figure 5. Referring to this figure, it will be noted that the heater 90 is formed from two parallel sections 91, 92 of heater wire. The upper ends of both coils are connected to a metal conductor rod 93 which extends through a steel end disk 94 and is enclosed by a vacuum sealing and insulating gasket 95. Similarly, the lower ends of the coils are connected to a conductor rod 96 which is provided with a similar gasket 95.

The cathode 11a is defined by a coil of resistance wire which is disposed within a rectangular metal frame 97 secured to a flat metal plate 98, this frame preventing or minimizing thermal or electrical interaction between the heater and cathode. It will be noted that the heater 90 is not grounded, Figure 3, so that there is little emission of electrons therefrom into the tube.

The upper end of the cathode coil is connected to a conductor rod 99 which passes through an opening in the plate 98 and is surrounded by a sleeve 100, preferably formed from glass. The lower end of the cathode coil is secured to a conductor rod 101 which extends through an opening in the plate 98 and is electrically connected thereto by a strap 102. The rods 99 and 101 are provided with gaskets 95 in the manner already described.

Also protruding from the base member 94 are three conductor rods 104, 105, and 106, each of which is provided with gasket 95. The rods 104, 105 are connected by suitable wires to the thermistor 41, Figure 1, while the rods 105, 106 are connected to a thermocouple 108, Figure 1, which is mounted within a well in the manner described in connection with the thermistor 41, and serves to indicate the temperature at the vicinity of the ion cage, and thus monitors the operation of the described control system.

Thus, the assembly 11 is well adapted to prevent interaction between the heater and cathode, so that a constant emission current can be maintained, and also a constant temperature within the ionization chamber 30.

As many possible embodiments may be made of this invention without departing from the scope thereof, it is to be understood that all matter herein set forth, or shown in the accompanying drawings is to be interpreted as illustrative and not in a limiting sense.

I claim:

1. A mass spectrometer comprising an elongated evacuated tube containing: a metal plate positioned in one end of said tube so that the plane of said plate is perpendicular to the axis of said tube, a first electrical heating element positioned adjacent said plate on the first side thereof facing the second end of said tube, a collector electrode positioned in the second end of said tube, a hollow metal cylinder positioned between said first heating element and said collector electrode to form an ionization chamber, the axis of said cylinder being coaxial of the axis of said tube, means to direct electrons liberated from said first heating element into said cylinder, means to direct preselected ions from said cylinder to said collector electrode, a temperature sensing means positioned in thermal contact with said cylinder, second and third electrical heating elements positioned adjacent said plate on the first side thereof on opposite sides of said first heating element, respectively, and a metal shield positioned between said first heating element and said second and third heating elements; a source of electrical energy; and means responsive to said temperature sensing means to apply said source of electrical energy to said second and third heating elements to maintain said ionization chamber at a preselected temperature.

2. A mass spectrometer comprising an elongated evactuated tube containing: a metal plate positioned in one end of said tube so that the plane of said plate is perpendicular to the axis of said tube, a first electrical heating element positioned adjacent said plate on the first side thereof facing the second end of said tube, a collector electrode positioned in the second end of said tube, a hollow metal cylinder positioned between said first heating element and said collector electrode to form an ionization chamber, the axis of said cylinder being coaxial of the axis of said tube, means to direct electrons liberated from said first heating element into said cylinder, means to direct preselected ions from said cylinder to said collector electrode, a thermistor well secured to the outside of said cylinder, a thermistor mounted in said well, second and third electrical heating elements positioned adjacent said plate on the first side thereof on opposite sides of said first heating element, respectively, and a metal shield positioned between said first heating element and said second and third heating elements; a bridge network including said thermistor to produce a signal representative of the temperature of said cylinder; a transformer having the secondary winding thereof connected to said second and third heating elements; a saturable reactor having a control winding and an operating winding; a current source connected in circuit with said operating winding and the primary winding of said transformer; and means to apply said signal to said control winding to regulate the impedance of said operating winding.

References Cited in the file of this patent

UNITED STATES PATENTS

| | | |
|---|---|---|
| 2,435,572 | Bixby | Feb. 10, 1948 |
| 2,511,981 | Hanchett | June 20, 1950 |
| 2,522,259 | Fay | Sept. 12, 1950 |
| 2,712,073 | Martin | June 28, 1955 |
| 2,721,271 | Bennett | Oct. 18, 1955 |
| 2,784,318 | Washburn et al. | Mar. 5, 1957 |